UNITED STATES PATENT OFFICE.

JEAN ALTWEGG AND JOANNY LANDRIVON, OF LYON, FRANCE, ASSIGNORS TO SOCIETE CHIMIQUE DES USINES DU RHONE (ANCIENNEMENT GILLIARD P. MONNET ET CARTIER), OF PARIS, FRANCE.

B-ALKYLAMINO-ETHYLAMINOBENZOIC ALKYL ESTERS AND THEIR DERIVATIVES.

1,334,642.      Specification of Letters Patent.     Patented Mar. 23, 1920.

No Drawing.     Application filed June 13, 1919. Serial No. 303,974.

*To all whom it may concern:*

Be it known that we, JEAN ALTWEGG, of 227$^{bis}$ Avenue de Saxe, Lyon, France, a citizen of the Confederation of Switzerland, and JOANNY LANDRIVON, of 22 Rue de l'Annonciade, Lyon, France, a citizen of the Republic of France, have invented certain new and useful β-Alkylamino-Ethylaminobenzoic Alkyl Esters and Their Derivatives, of which the following is a specification.

This invention has for its object the manufacture of the β-alkylamino-ethylamino-benzoic alkyl esters, having the general formula $$R'_2NCH_2CH_2NHC_6H_4COO.R$$

where R' represents ether a hydrogen atom or an alkyl radical, and R an alkyl radical. According to this invention β-alkylamino-ethylamino-benzoic alkyl esters can be obtained by heating for several hours in a closed vessel at a temperature of approximately 100° C. a mixture of an alkylamin and of a β-halogen-ethyl-aminobenzoic ester having the general formula $$xCH_2CH_2NHC_6H_4COOR$$

where $x$ represents a halogen and R an alkyl radical. The new esters obtained in this manner occur as oils insoluble in water. Their mono-hydrochlorids can be obtained by addition of hydrochloric acid in equal molecular proportion. The latter salts are easily crystallized and are very soluble in water with which they form neutral solutions.

Example I: A mixture of two molecules of diethylamin and one molecule of ethyl β-chlorethyl-p-amino-benzoate having the formula $$ClCH_2CH_2NHC_6H_4COOC_2H_5$$

is heated for several hours at a temperature of approximately 100° in a closed vessel. After cooling a crystalline mass is obtained which is treated with water to eliminate the diethylamin hydrochlorid resulting from the reaction. The new ester separates as an oily liquid, and is the ethyl β-diethyl-amino-ethylamino benzoate having the formula $$(C_2H_5)_2NCH_2CH_2NHC_6H_4COOC_2H_5$$

It is washed with water and decanted. In order to obtain the mono-hydrochlorid it suffices to dissolve the ethyl β-diethyl-amino-ethylamino benzoate in dilute hydrochloric acid in theoretical proportion and to evaporate to dryness. After recrystallization from alcohol white needles with a melting point of 156° C. are obtained.

Example II: Admixture of one molecule of β-chlorethyl-paramino-benzoate of normal butyl and two molecules of diethylamin is heated in a closed vessel on the water bath. After heating for 10 hours, the resulting products are cooled and treated with cold water. The diethylamino-ethyl-paramino benzoate of normal butyl separates in the form of oil, and this oil is washed with water and distilled under reduced pressure, the principal fraction distilling over at 213°–214°, under 6 mm. of mercury. In order to obtain the monochlorhydrate of this ether-base, one operates as indicated in Example I. This monochlorhydrate melts at 127°, and is soluble in water with a neutral reaction. It is fairly soluble in ethyl and methyl alcohol, less soluble in acetone, little soluble in benzin.

Example III: In replacing in Example II the two molecules of diethylamin by two molecules of monomethylamin, one obtains, in operating similarly, as an ether-base, the mono-β-methylamino-ethyl-paramino benzoate of normal butyl, in the form of an alkaline oil distilling at 214° under a pressure of 6 mm. of mercury. Its monochlorhydrate melts at 141°.

It is understood that the above examples are given by way of illustrative example only, and may be varied in details according to the particular reagents employed.

What we claim and desire to secure by Letters Patent is:—

1. The new industrial products the β-alkyl amino-ethylamino-benzoic alkyl esters which may be obtained by the above described process, being oils insoluble in water.

2. The new industrial products, the monohydrochlorids of β-alkylamino-ethylamino-benzoic alkyl ester which may be obtained by the above described process being crystalline salts, very soluble in water with which they form neutral solutions.

In witness whereof we have hereunto signed our names in the presence of two subscribing witnesses.

JEAN ALTWEGG.
J. LANDRIVON.

Witnesses:
 MARIN VACHON,
 LOUIS ESCHER.